3,017,429
PRODUCTION OF LINALYL ACETATE
Peter Nayler, Willerby, England, assignor to The Distillers Company Limited, Edinburgh, Scotland, a British company
No Drawing. Filed Mar. 22, 1960, Ser. No. 16,655
Claims priority, application Great Britain May 7, 1959
3 Claims. (Cl. 260—489)

The present invention relates to the production of linalyl acetate.

The present invention is a process of producing linalyl acetate which comprises contacting linalool with ketene at a temperature below 30° C. in the presence of an acid esterification catalyst.

The process may conveniently be carried out by passing ketene into a reactor containing linalool and the acid esterification catalyst. The acid esterification catalyst may be, for example, toluene para sulphonic acid or sulphuric acid.

The linalyl acetate produced may be recovered by distilling the product of the process, after neutralising the acid esterification catalyst.

Linalyl acetate is known to be a useful perfumery material.

In the following examples, which further illustrate the invention, the percentages are given by weight.

Example 1

Ketene was passed into a reactor maintained at 20° C. and containing 100 parts by weight of linalool and 1 part by weight of toluene para sulphonic acid. The ketene and linalool reacted to produce linalyl acetate.

The ketene absorbed in the reaction was 0.83 mole of ketene per mole of linalool. The conversion of linalool to linalyl acetate was 73.5%; the yield of linalyl acetate was 86.5% based on the linalool consumed. No geranyl acetate was detected.

Example 2

The procedure of Example 1 was carried out using 500 parts by weight of linalool and 5 parts by weight of toluene para sulphonic acid.

The ketene absorbed in the reaction was 0.8 mole of ketene per mole of linalool. The yield of linalyl acetate was 84% based on the linalool consumed. No geranyl acetate was detected.

Example 3

The procedure of Example 1 was carried out except that the reactor containing the linalool and toluene para sulphonic acid was maintained at 0° C.

The ketene and linalool reacted to produce linalyl acetate; no geraniol or geranyl acetate was detected.

In contrast to these examples illustrating the invention, when ketene was passed into a reactor maintained at 50° C. and containing 250 parts by weight of linalool and 2.5 parts by weight of toluene para sulphonic acid, the product consisted of a mixture of linalool, linalyl acetate, geranyl acetate, dehydration products and high boiling resins.

The yield of linalyl acetate was only 32.5% based on the linalool consumed. The separation of the geranyl acetate and linalyl acetate could only be effected by careful distillation.

I claim:
1. A process of producing linalyl acetate which comprises contacting linalool with ketene at a temperature below 30° C. in the presence of an acid esterification catalyst selected from the group consisting of para-toluene sulphonic acid and sulphuric acid.
2. The process claimed in claim 1 wherein the acid esterification catalyst is sulphuric acid.
3. A process of producing linalyl acetate which comprises contacting linalool with ketene at a temperature below 30° C. in the presence of paratoluene sulphonic acid.

No references cited.